(12) United States Patent
Durst et al.

(10) Patent No.: US 10,998,693 B1
(45) Date of Patent: May 4, 2021

(54) STIMULATED X-RAY EMISSION SOURCE WITH CRYSTALLINE RESONANCE CAVITY

(71) Applicant: Bruker AXS GmbH, Karlsruhe (DE)

(72) Inventors: Roger D. Durst, Pfinztal (DE); Juergen Graf, Rosengarten (DE); Christoph Ollinger, Karlsruhe (DE)

(*) Notice: Subject to any disclaimer, the term of this patent is extended or adjusted under 35 U.S.C. 154(b) by 0 days.

(21) Appl. No.: 16/747,323

(22) Filed: Jan. 20, 2020

(51) Int. Cl.
  *H01S 3/30* (2006.01)
  *H01S 4/00* (2006.01)
  *H01S 3/0959* (2006.01)

(52) U.S. Cl.
  CPC ............. *H01S 4/00* (2013.01); *H01S 3/0959* (2013.01)

(58) Field of Classification Search
  CPC .................................... H01S 4/00; H01S 3/30
  See application file for complete search history.

(56) References Cited

U.S. PATENT DOCUMENTS

| | | | | |
|---|---|---|---|---|
| 3,484,721 A | * | 12/1969 | Rentzepis | H01S 4/00 372/69 |
| 3,617,939 A | * | 11/1971 | Bond | H01S 4/00 372/69 |
| 3,967,213 A | | 6/1976 | Yariv | |
| 4,958,363 A | * | 9/1990 | Nelson | B82Y 10/00 378/145 |
| 5,257,303 A | * | 10/1993 | Das Gupta | H01J 35/112 378/85 |

OTHER PUBLICATIONS

Caticha, Ariel et al., "Resonant Cavity for the Stimulated Emission of X Rays" Applied Physics Letters 54, 887 (1989).

* cited by examiner

*Primary Examiner* — Kinam Park
(74) *Attorney, Agent, or Firm* — Benoit & Côté Inc.

(57) ABSTRACT

An X-ray laser has a target anode of a crystalline material that emits X-ray radiation in response to excitation and that is located on a thermally conductive substrate. An X-ray source provides an input X-ray beam that illuminates a predetermined volume of the target anode at a predefined angle relative to a surface of the anode so as to induce a Borrmann mode standing wave in the predetermined volume. An electron source outputs an electron beam that is incident on the Borrmann mode region so as to cause electron impact ionization of the crystalline material and thereby induce stimulated emission of a coherent output X-ray beam.

20 Claims, 3 Drawing Sheets

STIMULATED X-RAY EMISSION SOURCE WITH CRYSTALLINE RESONANCE CAVITY

BACKGROUND OF THE INVENTION

Field of the Invention

This invention relates generally to the field of X-ray emission sources and, more particularly, to a highly-brilliant X-ray laser.

Description of the Related Art

Single crystal X-ray diffraction or crystallography requires a highly brilliant, highly monochromatic and well collimated (non-divergent) source. It is well-understood in the prior art that an X-ray laser fulfills these requirements better than most available sources. Indeed, free electron lasers are currently the most brilliant sources of X-rays available (see, e.g., B. Patterson, *Crystallography using Free Electron Lasers,* Crystallography Reviews, 20, 2014, 242-294). However, the current generation of free electron lasers are found primarily in expensive national facilities, and more affordable options are generally unavailable.

One prior art version of an X-ray laser is described in U.S. Pat. No. 3,967,213 to Yariv. Therein, Yariv describes a concept in which a crystal is pumped by an external energy source such that X-rays near the Bragg angle are trapped between lattice planes of the crystal by diffraction. Thus, the crystal acts as a resonant cavity for X-rays and it is therefore, in principle, possible to produce X-ray lasing in such a crystal. In practice, however, due to an inefficient ionization process, it is possible to operate such a laser only in a single-pulse mode, which is not particularly useful for laboratory diffraction experiments. In particular, a majority of the ionizing radiation (whether photons or electrons) produces waste heat. Because the excited state lifetimes of the K-shell (i.e., the principal energy level) of the crystal material are on the order of femtoseconds, a very high ionization rate is required to create the requisite population inversion. However, due to the excess heat generated, an ionization rate sufficient to attain a steady state population inversion would also be so high as to thermally destroy the crystal.

Another configuration for an X-ray source is described by A. Caticha et al. in *Resonant Cavity for the stimulated emission of X-rays,* Applied Phys. Lett. 54, 887 (1989). In this article, it was postulated that an external source of X-rays that impinges on a crystal at the Bragg angle can create a standing wave in a crystal resonator (a phenomenon known as the Borrmann effect, or Borrmann mode). This standing wave can, in turn, induce stimulated emission at much lower ion densities than are necessary in the concept of Yariv. The condition for stimulated emission in the crystal is that the intensity of the standing wave must be high enough that an excited ion in the crystal has a significantly higher probability of interacting with an actual photon in the standing wave mode (and thus producing a stimulated X-ray) than interacting with a virtual photon (which would produce a spontaneous emission event).

In the idealized case of a perfect crystal, Caticha gives the stimulated X-ray emission as:

$$n_k(z) = n_k(0) \exp[(Bn_i - 1/\tau)(z/v_G)]$$

where $n_k(z)$ is the number density of photons in state k at position z, $n_k(0)$ are the number density of photons at the crystal entrance (that is, the density of photons in the externally-driven Borrmann mode), B is the rate coefficient for stimulated emission, $n_i$ is the number density of K-shell ions and $\tau$ and $v_G$ are, respectively, the lifetime and group velocity of photons in the Borrmann mode.

As indicated by the formula above, in order to achieve an X-ray laser with high gain it is necessary to have both a high density of photons in the induced Borrmann mode, $n_k(0)$, and a high density of K-shell ions, $n_i$. It is also necessary that the lifetime and group velocity of photons in the Borrmann mode, $\tau$ and $v_G$ are, respectively, as high and as low as possible. As these are both characteristics of the lasing crystal, it implies that the crystal lattice must be as perfect as possible.

U.S. Pat. No. 5,257,303 to Das Gupta describes an X-ray source based upon the theory of Caticha et al. In this disclosure, an X-ray tube with a bi-metallic anode produces two different X-ray wavelengths. A longer X-ray wavelength serves to excite a standing wave (Borrmann mode) in a lasing crystal, while a second, shorter wavelength ionizes atoms in the lasing crystal to produce K-shell holes. This, in turn, produces stimulated X-rays due to the resonant standing wave field.

The Das Gupta technique was demonstrated experimentally in *CuKα1 X-ray Laser,* Physics Letters A 189 (1994) 91-93 using a copper-tungsten anode to excite Cu Kα1 radiation from a copper crystal. The experiment proved that it is possible to create a stimulated X-ray beam in a copper crystal that is very highly collimated and very spectrally pure, which makes it interesting for X-ray diffraction. However, the total X-ray flux produced by the tube was not measurably higher than a conventional X-ray tube.

SUMMARY OF THE INVENTION

In accordance with the present invention, an X-ray laser is provided that uses excitation of a target anode of a crystalline material, which is preferably located on a substrate having a high relative thermal conductivity. An X-ray source provides an input X-ray beam that is directed at a predetermined volume of the target anode at a predefined angle relative to a crystal lattice of the anode so as to induce a Borrmann mode standing wave in the predetermined volume. An electron source, such as a dispenser cathode, is also provided and emits an electron beam that is incident on the predetermined volume of the anode so as to cause electron impact ionization of the crystalline material. This, in turn, induces stimulated emission of a substantially coherent output X-ray beam.

In an exemplary embodiment of the invention, the X-ray source is a microfocus X-ray tube, and the input X-ray beam has a low angular divergence, preferably less than or equal to an intrinsic rocking curve width of the crystalline material (e.g., less than 0.2 degrees). In one embodiment, the input X-ray beam is directed toward a surface of the target anode that is different than a surface of the anode upon which the electron beam is incident, while in an alternative embodiment, the input X-ray beam is directed toward the same surface as that illuminated by the electron beam. The X-ray beam may be collimated prior to illuminating the target anode using a collimator such as a pinhole aperture. The target anode, substrate and electron source may be located in an evacuated housing, which can include windows that are substantially transparent to X-ray radiation through which the input X-ray beam and the output X-ray beam pass. To conserve energy, the volume of the target anode upon which the electron beam is incident can be limited to substantially just the predetermined volume that is illuminated by the input X-ray beam. To minimize thermal gradients and other thermal stresses in the anode material, the substrate may also be actively cooled, such as by using a liquid cooling system.

DETAILED DESCRIPTION

Figure 1:
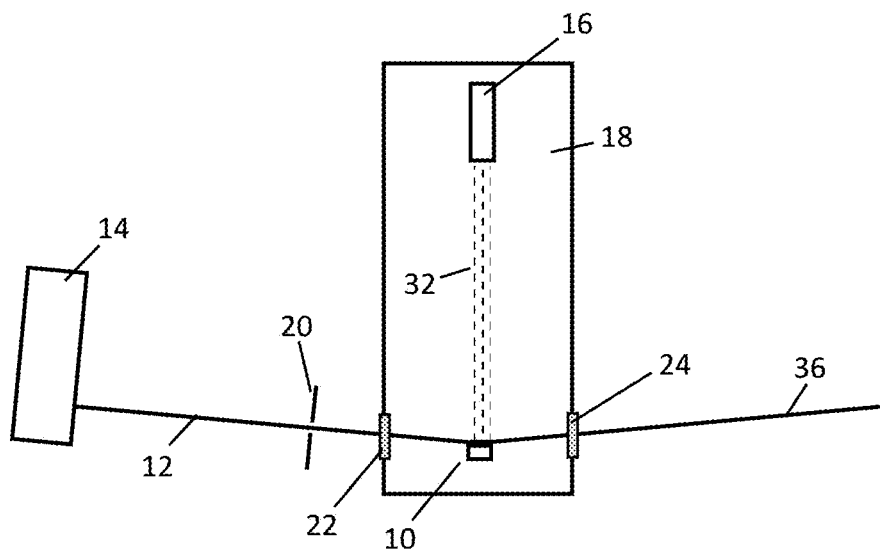
FIG. 1 is a cross-sectional schematic front view of an X-ray laser according to the present invention.

Shown in FIG. 1 is a cross-sectional schematic view of an X-ray emission source according to the present invention. The source relies on stimulated emission of coherent X-ray radiation from an anode structure 10 having a crystalline target anode. In the exemplary embodiment, the anode is copper (Cu), molybdenum (Mo) or Silver (Ag), as the emission wavelengths from these materials are commonly used in X-ray applications, but those skilled in the art will understand that other crystalline materials may be used as well.

An X-ray beam 12 is directed onto the anode from a microfocus X-ray tube 14 (also referred to as the "drive tube"). The drive tube is chosen such that the anode material in the drive tube is the same as that of target anode material, so as to provide wavelength matching between the kα radiation of the drive tube and the emission modes of the anode target. The interaction of the X-ray beam 12 with the anode induces an X-ray standing wave, known as the Borrmann mode, in the anode crystal. Ionization is then produced in the anode material via electron bombardment from electron source 16. The k-shell ions created in the ionization recombine to emit stimulated X-rays due to interaction with the Borrmann mode photons, which results in the emission of a coherent X-ray beam 36 from the anode structure 10.

In the FIG. 1 embodiment, the anode structure 10 and electron source 16 are located in an evacuated housing 18. The electron source 16 is selected to provide a uniform illumination of the region of the anode upon which it is incident. A particularly appropriate choice for the electron source 16 would be a dispenser cathode such as, for example, one chosen from the line of dispenser cathodes produced by Ceradyne, Inc. (3M Advanced Materials Division). As discussed further below, the uniform distribution of electrons that such a cathode provides minimizes distortions in the anode target material due to differential thermal expansion or strong heating, which might otherwise negatively impact the Borrmann effect in the anode crystal. In addition, the total electron beam power is preferably less than 50 W so as to minimize other thermal effects, such as thermal vibration and thermal distortion.

To ensure that the X-ray beam 12 from the drive source 14 provides the desired standing wave in the anode material, the beam 12 has a very low angular divergence and is focused only on the region of the anode in which the Borrmann mode is to be induced, and which will be illuminated by the electron source 16. In particular, the beam 12 has a divergence that is less than or equal to the natural Bragg rocking curve width of the anode material. That is, the divergence angle of the beam is no more than the intrinsic full-width half-maximum value of the rocking curve for a perfect anode crystal which, for copper, is approximately 0.2 degrees. The drive source 14 is thus selected and positioned to minimize this divergence angle, which is also affected by the distance between the drive source and the anode 10.

Both the limiting of the divergence angle and the limiting of the portion of the anode illuminated by the beam 12 is aided by the use of aperture 20 located in the path of the beam 12. The aperture 20 blocks portions of the beam that have a high relative divergence and/or that would fall outside of the region of the anode that will be illuminated by the electron beam. The portion of the input X-ray beam that passes through the aperture is therefore collimated in two directions, forming a "pencil beam" that passes through a first X-ray window 22, which is of a material transparent to X-ray radiation, such as beryllium. The beam output from the anode structure 10 passes through a second X-ray window 24 that is of similar composition, and that is positioned on the opposite side of the housing 18.

Figure 2:
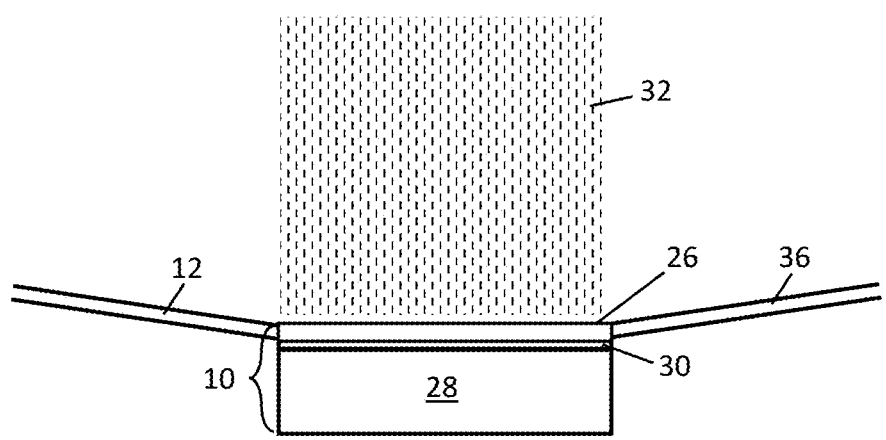
FIG. 2 is a schematic front view of an anode of the X-ray laser of FIG. 1.

An enlarged schematic view of the anode structure 10 is shown in FIG. 2. In the present embodiment, the anode structure includes target layer 26 of a desired crystalline material (e.g., Cu), and a substrate 28 of relatively high thermal conductivity, such as diamond. Although diamond has a particularly high thermal conductivity, those skilled in the art will understand that other high thermal conductivity materials may also be used. In this embodiment, an intermediate layer 30 may also be located between the target layer 26 and the substrate 28 that provides an improved interface between them. Such an intermediate layer might, for example, enhance the bonding between the target layer 26 and the substrate 28, as might be provided by a metal carbide material. The intermediate layer 30 might also, or alternatively, provide a matching of the acoustic impedances of the target layer 26 and the substrate 28. A heat dissipation layer may also be included that has a significantly higher thermal conductivity than the target material. A preferred version of the anode structure could be one of the embodiments shown in co-pending U.S. patent application Ser. No. 15/679,853, the details of which are incorporated herein by reference. In one version of the invention, the substrate is also water cooled in order to provide additional heat absorption from the target layer, as is discussed below in conjunction with FIG. 4.

In order to maintain a high efficiency in the anode, and therefore a high brilliance in the X-ray laser output, ionization by the electron beam 32 from electron source 16 is limited to the region of the anode target in which a Borrmann mode is developed using X-ray beam 12. In the embodiment shown in FIG. 2, the input X-ray beam enters the target layer 26 of the anode along a side of the crystal, and the Borrmann mode runs the length of the target layer. As discussed further below, the width of the Borrmann mode region in a perpendicular direction along the top surface of the crystal can span the entire width, or can be limited to just a portion thereof. The size of the anode crystal may be selected accordingly, and the volume illuminated by the electron beam 32 is chosen to correspond to the desired Borrmann mode region. It is also possible to direct the input X-ray beam into the target layer through the top surface of the crystal and, thus, also possible to reduce the length of the Borrmann mode region relative to the overall length of the crystal. This is also discussed below with respect to an alternative embodiment shown in FIG. 6.

Figure 3:
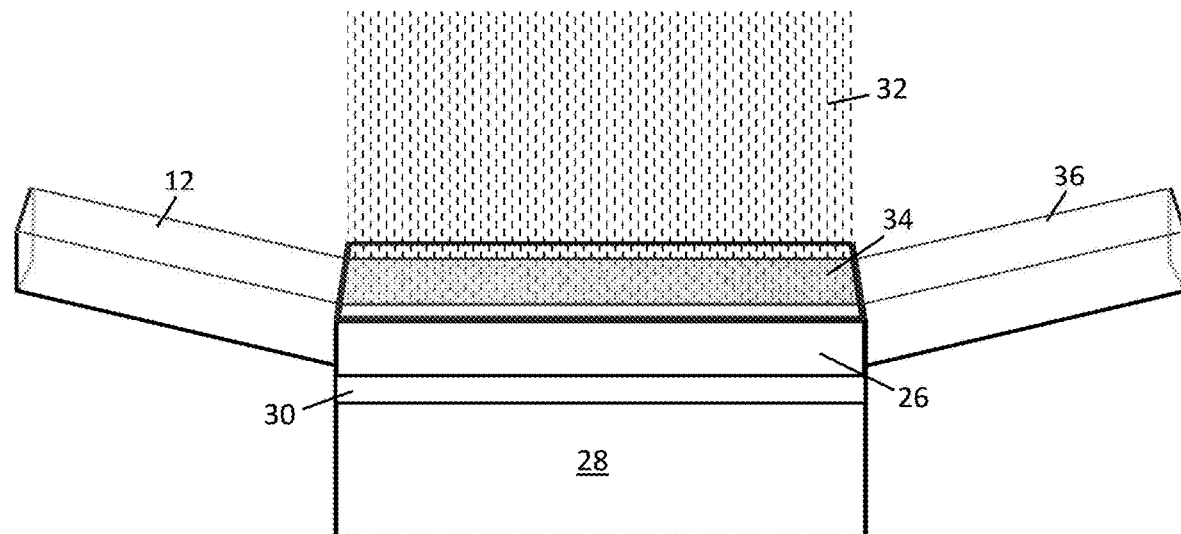
FIG. 3 is a schematic perspective view of the anode depicted in FIG. 2, showing the anode region in which stimulated emission occurs.

When the input beam 12 illuminates the target layer 26 at the appropriate Bragg angle, the X-ray radiation interacts with a desired region 34 of the target layer, as shown in the perspective view of FIG. 3. The Borrmann mode X-ray standing wave is developed only in this region, and the electron beam 32 is therefore carefully focused to be incident only on the Borrmann mode region 34. The stimulated emission in the Borrmann region results in a coherent X-ray output beam 36 that, like the input beam 12, is highly collimated in the two lateral directions. The beam shape may be determined by the output optics of the drive beam source 14 and the aperture 20 and, in the embodiment shown in FIG. 3, has a generally rectangular profile. As shown in the figure, the input X-ray beam 12 and the electron beam 32 are both limited to the Borrmann mode region 34 so as to minimize wasted energy. As with FIG. 2, the housing 18 and electron source 16 are omitted from this figure for clarity.

One lateral dimension of the output laser beam 36 (that essentially perpendicular to the top surface of the target layer 26) is determined by the depth of the electron beam penetration into the crystal material. Thus, the penetration depth of the incident electrons is chosen to be deeper than the desired vertical dimension of the beam. In an exemplary embodiment, the lateral dimensions of the X-ray beam are chosen to be equal to the size of the sample of interest which, in modern diffraction experiments, is typically on the order of 10-50 µm. In such an embodiment, suitable for a 50 µm sample, the desired lateral dimensions of the output laser beam 36 are approximately 50 µm×50 µm, and the system is therefore designed to provide an electron penetration depth of more than 50 µm. For a copper, molybdenum or silver target material, an electron penetration depth of about 50 µm is achieved by an electron of about 200 keV. Thus, in this embodiment, the electron beam has a typical energy of 200 keV. For smaller beams, suitable for smaller samples, a lower electron energy may be used. For example, a beam size of 10 µm×10 µm, appropriate for a 10 µm sample, would require an electron beam energy of 70 keV. In any case, however, to avoid damaging the lasing crystal lattice by inducing displacement defects or by sputtering, the electron energy is kept below the knock-on damage threshold for the lasing crystal. Thus, the electron beam energy is kept below 250 keV.

Figure 4:
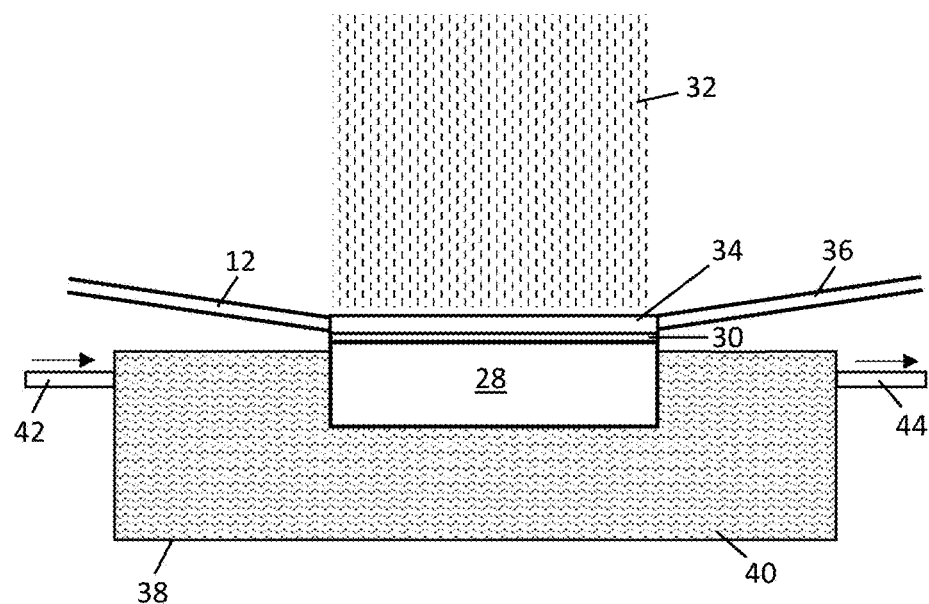
FIG. 4 is a cross-sectional schematic front view of an anode of the present invention with a liquid cooled substrate.

In order to minimize thermal distortion of the crystal lattice, which can quench the desired Bormann mode, the substrate may be provided with a cooling mechanism. In the exemplary embodiment, water cooling is used, as shown in FIG. 4. In this configuration, the diamond substrate 28 is immersed in a receptacle 38 of a cooling fluid 40, such as water. The fluid may be circulated to enhance the cooling effect, being introduced to the receptacle 38 via inlet port 42 and withdrawn via outlet port 44. In one version of this embodiment, the fluid exiting the output port 44 is cooled and reintroduced via inlet port 42, thus forming a closed-circuit cooling system. Those skilled in the art will recognize that this represents just one possible cooling method, and other cooling technologies could also be used. In the present embodiment, the cooling system is capable of keeping the laser crystal temperature at 290 K or below, and maintains a temperature gradient across the surface of the crystal of less than 0.1 K.

Figure 5:
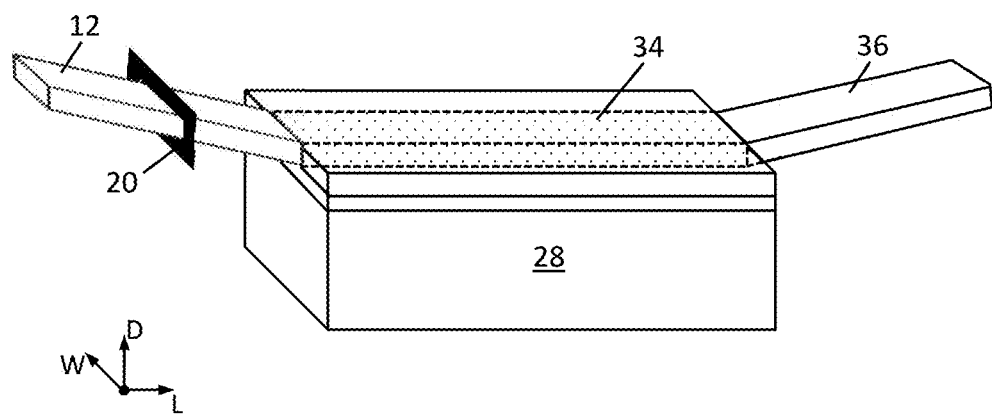
FIG. 5 is a perspective view of an anode according to the present invention in which the X-ray beam shape is oblong.

Shown in FIG. 5 is an embodiment of the invention in which the X-ray beam 12 from drive source 14 has an oblong profile. The crystal target layer 26 is sized to be approximately the same length as the desired Borrmann mode region 34, which is shown in the figure in broken lines. The electron beam 32 is sized to illuminate the selected Borrmann mode region 34, and the ionization caused thereby induces the desired stimulated X-ray emission of output X-ray beam 36. The shape of the input X-ray beam 12 is chosen to best match the shape of the ionization volume formed by the electron beam 32, both in its width and its depth, as matching the ionization volume and the Borrmann mode region 34 provides the most efficient energy transfer. In the orientation of the crystal shown in FIG. 5, the labels L, W and D, respectively, of the reference axes shown in the figure are used to identify three perpendicular directions, including the length and width dimensions parallel to the top surface of the crystal, and the depth direction parallel to the direction of the electron beam 32. In this embodiment, the input beam 12 has a rectangular profile that has a greater width dimension than depth dimension, resulting in a rectangular Borrmann standing wave region that is wider than it is deep. Such a beam shape may be useful for certain applications, although a "pencil beam" of roughly equal width and depth may be more appropriate in other applications.

As discussed above, the shape of the ionization region is dependent on the characteristics of the electron beam 32. The length and width of the electron beam determine the length and width of the ionization region in the surface of the anode. In the embodiment shown in FIG. 5, this ionization region extends the full length of the anode crystal, while occupying a center portion of the overall crystal width. The depth of the ionization region depends on the energy of the electrons in the electron beam 32 and this, in turn, determines the corresponding depth dimension of the output X-ray beam. Thus, for example, for an output beam having a size of 10 µm in the dimension D of the ionization region in a copper anode, an electron energy of 70 keV would be appropriate, as it provides a penetration depth of about 10 µm. A greater penetration depth, and therefore an output beam with a larger size in this direction, is possible by increasing the electron energy. For example, an energy of 200 keV would provide a penetration depth of about 50 µm. In the exemplary embodiment, however, an electron energy of more than about 250 keV is not used as electron energies in this range can damage the crystal lattice due to knock on damage.

Due to scattering of the incident electrons, the width of the ionization volume produced by the electron beam 32 is generally no less than the depth. As in the FIG. 5 embodiment, however, this volume may be made larger via the electron source geometry and the electron optics. In the embodiment of FIG. 3, the output X-ray beam 36 beam is symmetrical in that the width approximately equals the depth. In other embodiments, however, an asymmetric beam in which the width is much greater that the depth may be desired, and this may be created by using an appropriately wide electron beam and input X-ray beam 12. The length of the ionization volume is also determined by the geometry of the electron source and the electron optics that may be used with it. In the present embodiment, the length of the ionization region is approximately equal to the size of the crystal, and the size of the crystal is limited to less than about 2-3 mm, as this is the maximum propagation distance for the Borrmann mode.

As shown in FIG. 5, the size and shape of the aperture 20 is also selected based on the desired beam shape, since the input beam 12 is chosen accordingly. In this embodiment, the desired beam shape is rectangular, having an oblong profile, and the aperture 20 is therefore also rectangular, and chosen to match the size and shape of the input beam. In this way, the width and depth of the input beam 12 match the shape of the ionization region, and X-rays outside of the ionization region are blocked by the aperture 20. Since X-rays outside of the ionization region 34 would not contribute to the stimulated emission of the output X-ray beam 36, they are undesirable, and blocking them prevents them from otherwise contributing to the scattered X-rays that represent a source of noise.

When the input X-ray beam is introduced via the side of the anode crystal, as in the foregoing embodiments, it is also possible to induce a Borrmann mode region that is below a top surface of the crystal, and with sufficient penetration depth, electron energy could reach this region to provide ionization. However, in the exemplary embodiment of the invention, the Borrmann mode is induced at the surface of the crystal to allow for ionization by the electron beam while minimizing noise and possible knock-on damage.

Figure 6:
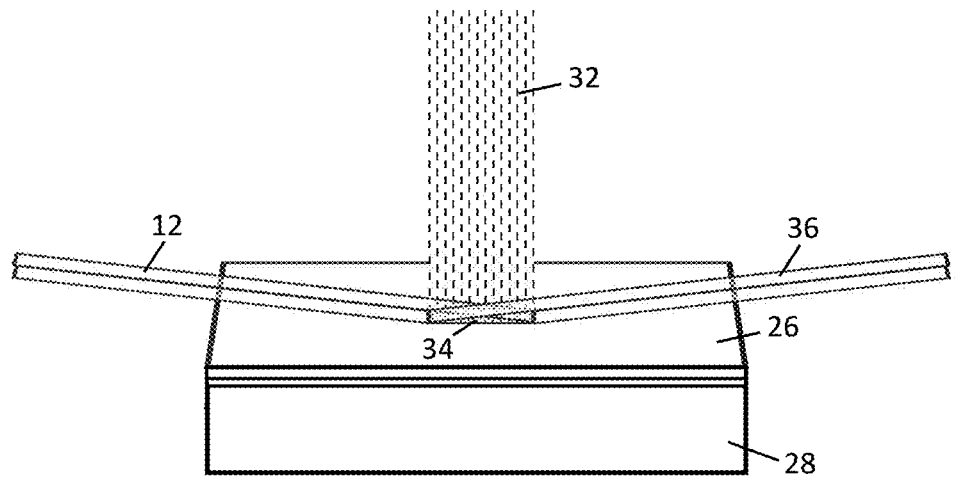
FIG. 6 is a perspective front view of an anode according to the present invention for which the input X-ray beam is directed at a top surface of the anode.

Another embodiment of the invention is shown in FIG. 6, in which the input X-ray beam 12 enters through the top of the anode crystal 26. In this figure, the size of the crystal relative to the Borrmann mode region 34 is exaggerated for descriptive purposes, and those skilled in the art will understand that this region may be much closer to the overall size of the anode crystal. As with the embodiment in which the input X-ray beam 12 enters through the side of the crystal, the beam 12 is directed toward the crystal at the Bragg angle of the crystal material. However, as it is incident on a region of the crystal that is not adjacent to the crystal edge, the Borrmann mode region 34 does not extend the full length of the crystal structure. Thus, this embodiment allows control over the length of the Borrmann mode region. However, unlike the side-entry embodiment, there is minimal control over the depth of the Borrmann mode region.

In the FIG. 6 embodiment, other aspects of the invention are the same as in the side-entry version. In particular, the electron beam can be arranged to control the length, width and depth of the ionization region. In both embodiments, this is typically selected to correspond to the Borrmann mode region. Other aspects of the crystal structure are also the same, and may include a substrate of high thermal conductivity and an intermediate layer between the target layer of the anode and the substrate that enhances the thermal and mechanical compatibility between the target layer and the substrate.

The invention claimed is:

1. An X-ray laser comprising:
   a target anode of a crystalline material that emits X-ray radiation in response to excitation;
   an X-ray source that provides an input X-ray beam having a wavelength A that is directed at a predetermined volume of the target anode at a predefined angle relative to a crystal lattice of the target anode so as to induce a Borrmann mode standing wave in the predetermined volume; and
   an electron source that emits an electron beam that is incident on the predetermined volume so as to cause electron impact ionization of the crystalline material and thereby induce stimulated emission of a substantially coherent output X-ray beam.

2. The X-ray laser according to claim 1 further comprising a collimator that collimates the input X-ray beam.

3. The X-ray laser according to claim 2 wherein the collimator comprises an aperture.

4. The X-ray laser according to claim 1 wherein the incidence of the electron beam on the target anode is limited substantially to the predetermined volume.

5. The X-ray laser according to claim 1 wherein the X-ray source comprises a microfocus X-ray tube.

6. The X-ray laser according to claim 1 further comprising a thermally conductive substrate on which the target anode is located.

7. The X-ray laser according to claim 6 further comprising a liquid cooling system that cools the substrate.

8. The X-ray laser according to claim 1 wherein the predefined angle of the input X-ray beam relative to a surface of the target anode is the Bragg angle of the crystalline material for the wavelength A of the input X-ray beam.

9. The X-ray laser according to claim 1 wherein the input X-ray beam has an angular divergence of no more than an intrinsic rocking curve width of the crystalline material.

10. The X-ray laser according to claim 9 wherein said angular divergence is no more than 0.2 degrees.

11. The X-ray laser according to claim 1 wherein the input X-ray beam enters the target anode through a surface of the anode that is different than a surface illuminated by the electron beam.

12. The X-ray laser according to claim 1 wherein the input X-ray beam enters the target anode through a surface of the target anode that is the same as a surface illuminated by the electron beam.

13. A method of generating a coherent X-ray output beam, the method comprising:
    providing a target anode of a crystalline material that emits X-ray radiation in response to excitation;
    directing an input X-ray beam having a wavelength A at a predetermined volume of the target anode at a predefined angle relative to a crystal lattice of the target anode so as to induce a Borrmann mode standing wave in the predetermined volume; and
    directing an electron beam from an electron source onto the predetermined volume so as to cause electron impact ionization of the crystalline material and thereby induce stimulated emission of said coherent X-ray output beam.

14. The method according to claim 13 further comprising collimating the input X-ray beam with an aperture.

15. The method according to claim 13 wherein the incidence of the electron beam on the target anode is limited substantially to the predetermined volume.

16. The method according to claim 13 wherein the input X-ray beam is generated with a microfocus X-ray tube.

17. The method according to claim 13 further comprising locating the target anode on a substrate having a high relative thermal conductivity.

18. The method according to claim 17 further comprising cooling the substrate with a liquid cooling system.

19. The method according to claim 13 wherein the predefined angle of the input X-ray beam relative to a surface of the target anode is the Bragg angle of the crystalline material for the wavelength A of the input X-ray beam.

20. The method according to claim 13 wherein directing an input X-ray beam at the target anode comprises directing the input X-ray beam at a surface of the target anode that is different than a surface at which the electron beam is directed.

* * * * *